(12) United States Patent
Prentner et al.

(10) Patent No.: US 10,660,437 B2
(45) Date of Patent: May 26, 2020

(54) ADJUSTMENT DEVICE

(71) Applicant: SAMET KALIP VE MADEN ESYA SAN. VE TIC. A.S., Kirac Esenyurt-Istanbul (TR)

(72) Inventors: Christian Prentner, Altach (AT); Himmet Tanriverdi, Esenyurt-Istanbul (TR)

(73) Assignee: SAMET KALIP VE MADEN ESYA SAN. VE TIC. A.S., Istanbul (TR)

( * ) Notice: Subject to any disclaimer, the term of this patent is extended or adjusted under 35 U.S.C. 154(b) by 428 days.

(21) Appl. No.: 15/512,708

(22) PCT Filed: Sep. 4, 2015

(86) PCT No.: PCT/EP2015/070265
§ 371 (c)(1),
(2) Date: Mar. 20, 2017

(87) PCT Pub. No.: WO2016/045942
PCT Pub. Date: Mar. 31, 2016

(65) Prior Publication Data
US 2017/0290425 A1 Oct. 12, 2017

(30) Foreign Application Priority Data

Sep. 26, 2014 (DE) .......................... 10 2014 113 954

(51) Int. Cl.
*A47B 88/956* (2017.01)
*A47B 88/90* (2017.01)
(Continued)

(52) U.S. Cl.
CPC .......... *A47B 88/956* (2017.01); *A47B 88/427* (2017.01); *F16H 25/14* (2013.01);
(Continued)

(58) Field of Classification Search
CPC ... A47B 88/956; A47B 88/427; A47B 88/407; A47B 88/60; A47B 2088/945; A47B 2088/901; F16H 25/14; F16H 25/18
See application file for complete search history.

(56) References Cited

U.S. PATENT DOCUMENTS 5,281,022 A 1/1994 Roek
9,039,108 B2 * 5/2015 Feuerstein ........... A47B 88/427
312/334.4

(Continued)

FOREIGN PATENT DOCUMENTS

CN 101224065 A 7/2008
CN 101543346 A 9/2009
(Continued)

OTHER PUBLICATIONS

EPO Translation of the Description of WO 2009/127466 A1, Stuffel et al., Oct. 22, 2009. (Year: 2019).*

(Continued)

*Primary Examiner* — Daniel D Yabut
(74) *Attorney, Agent, or Firm* — Steven M. Shape; Dennemeyer & Associates, LLC

(57) ABSTRACT

The invention relates to an adjustment device for adjusting the orientation of a front panel of a drawer, having a holder (10) and an adjustment unit (40), wherein the adjustment unit (40) can be adjusted in relation to the holder (10) by means of an adjuster (30). For reliable angle orientation of the front panel of the drawer, the invention makes provision for the adjuster (30) to have two adjustable supporting portions (38, 39), which interact with abutments (10.16, 10.17) such that the adjustment unit (40) can be adjusted with guidance in two opposite directions, that the supporting (Continued)

Figure 1:
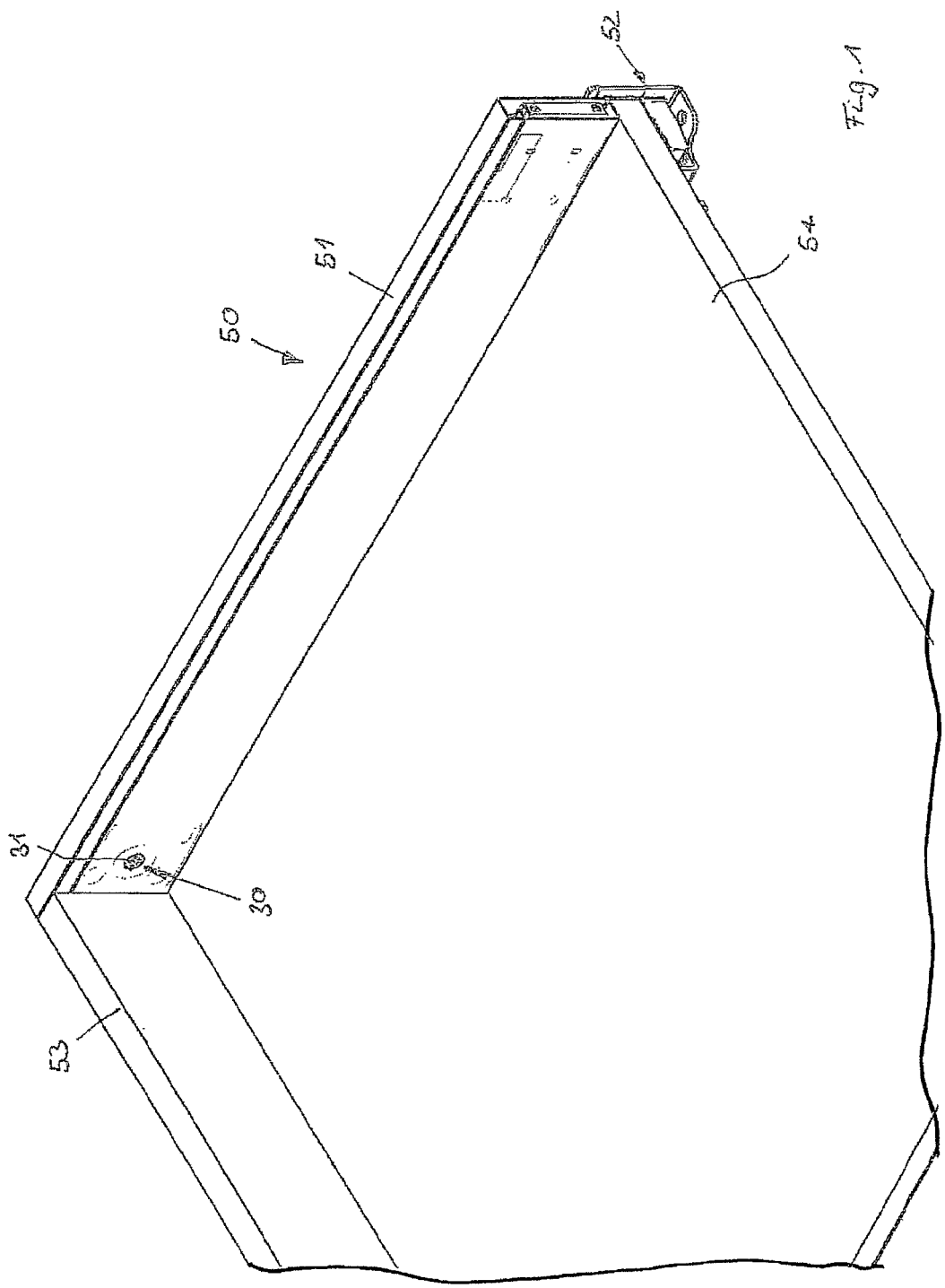

portions (38, 39) can each be adjusted on an eccentric track, and that the eccentric tracks are oriented in opposite directions.

10 Claims, 8 Drawing Sheets

(51) Int. Cl.
    *F16H 25/18*     (2006.01)
    *F16H 25/14*     (2006.01)
    *A47B 88/427*     (2017.01)
    *A47B 88/95*     (2017.01)

(52) U.S. Cl.
    CPC ........ *F16H 25/18* (2013.01); *A47B 2088/901* (2017.01); *A47B 2088/954* (2017.01)

(56) References Cited

U.S. PATENT DOCUMENTS

| | | |
|---|---|---|
| 2009/0174299 A1 | 7/2009 | Lam et al. |
| 2014/0055021 A1* | 2/2014 | Grabherr .............. A47B 88/427 312/334.8 |

FOREIGN PATENT DOCUMENTS

| | | | |
|---|---|---|---|
| CN | 102007259 A | 4/2011 | |
| CN | 103479100 A | 1/2014 | |
| DE | 202008012170 U1 | 9/2009 | |
| DE | 102015102771 A1 * | 9/2016 | ........... A47B 88/956 |
| EP | 1203861 A2 | 5/2002 | |
| EP | 3009043 A1 * | 4/2016 | ........... A47B 88/956 |
| WO | WO-2008037549 A1 * | 4/2008 | ........... A47B 88/956 |
| WO | WO-2009127466 A1 * | 10/2009 | ........... E05D 7/0407 |
| WO | 2012092633 A1 | 7/2012 | |
| WO | 2012142630 A1 | 10/2012 | |

OTHER PUBLICATIONS

EPO Translation of the Description of EP 3009043 A1, Arnst et al., Apr. 20, 2016. (Year: 2019).*
Office Action issued in connection with Chinese Application No. 201580051367.9 dated Oct. 26, 2018.
Search Report issued in connection with Chinese Application No. 2015800513679 dated Oct. 18, 2018.
Search Report issued in connection with PCT Application No. PCT/EP2015/070265 dated Oct. 28, 2015.

* cited by examiner

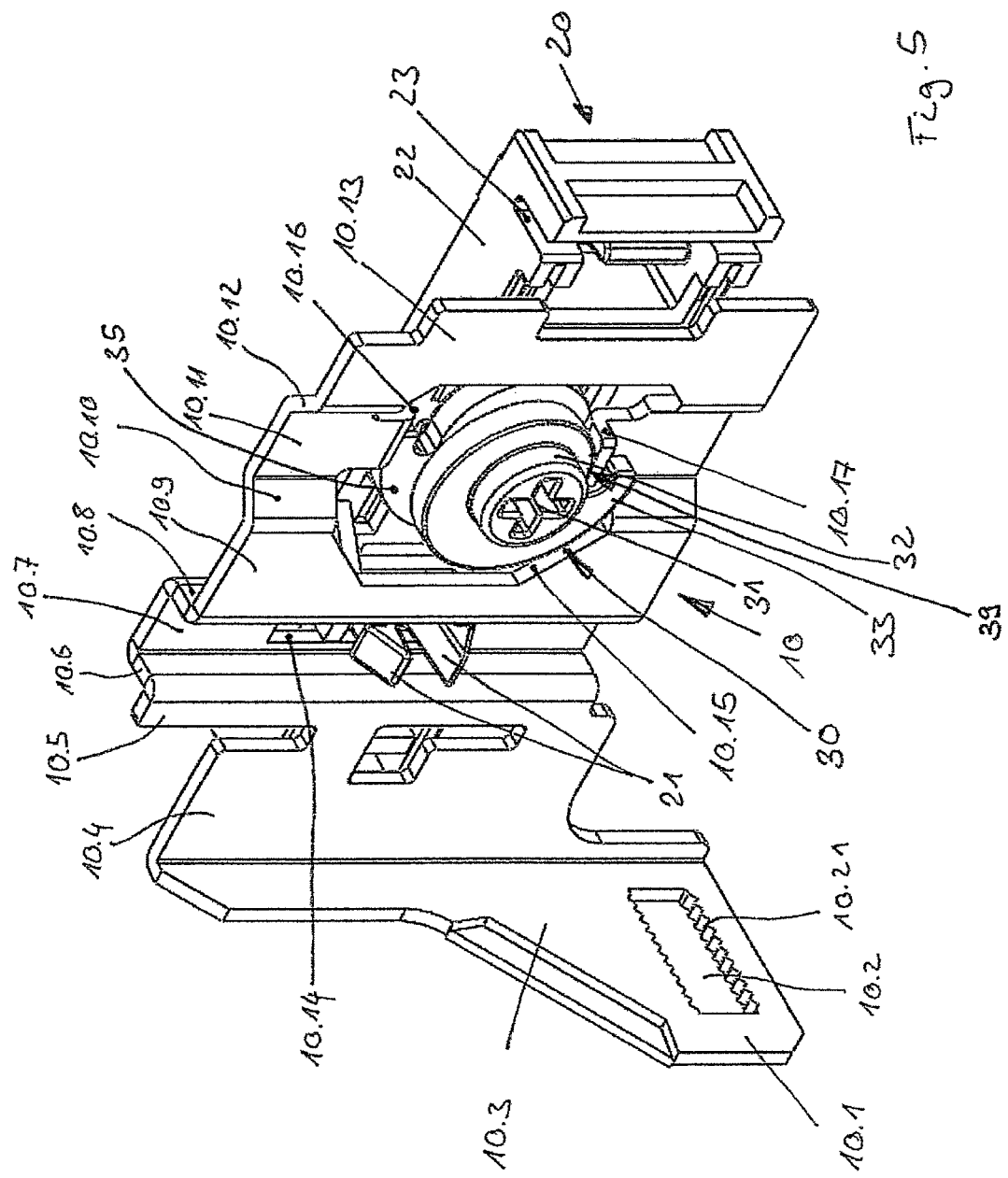

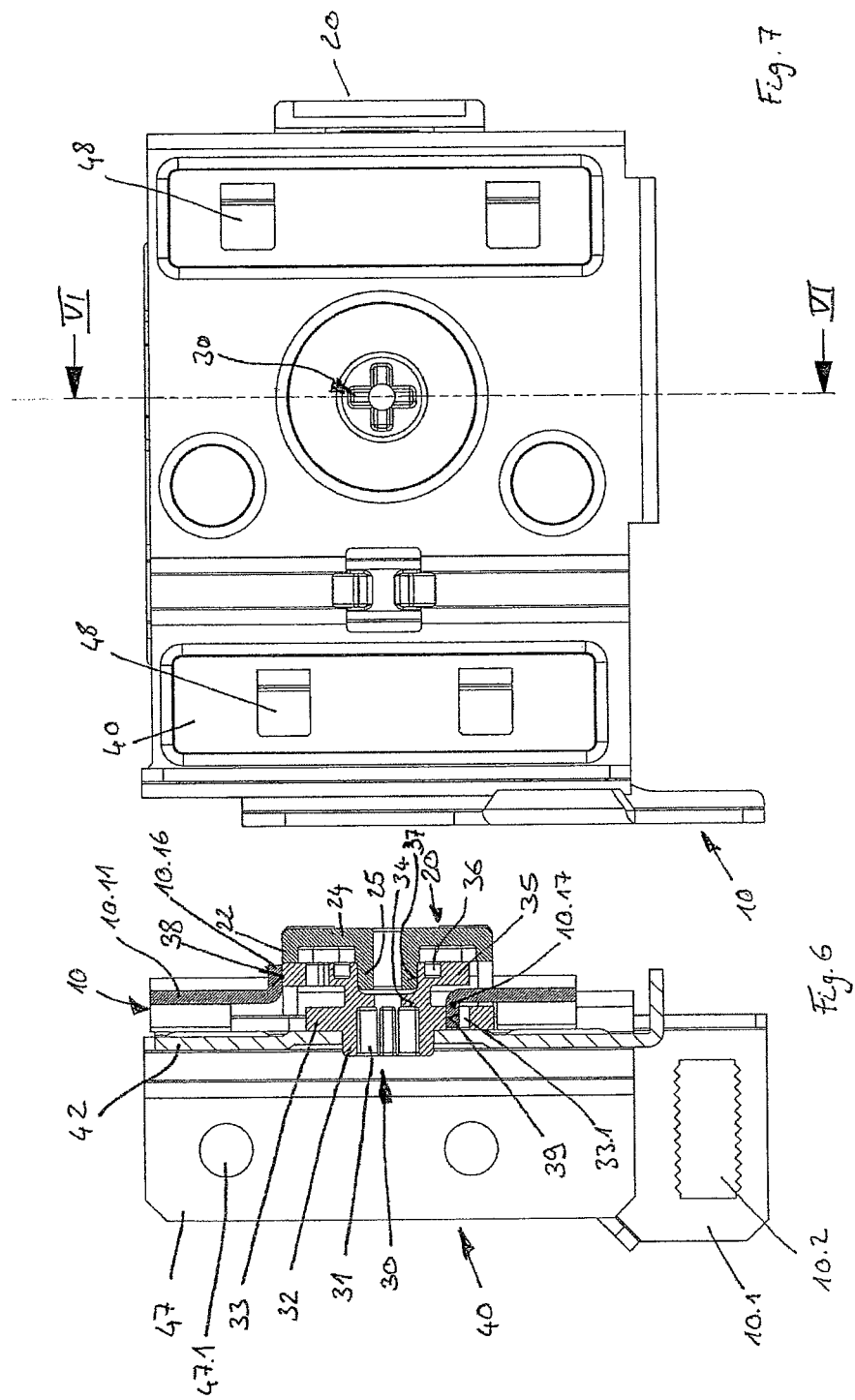

ADJUSTMENT DEVICE

The invention relates to an adjustment device for adjusting the alignment of a front panel of a drawer, said adjustment device having a holder and an actuating unit, wherein the actuating unit is adjustable in relation to the holder by means of an adjusting device.

Precise alignment of the front panel in relation to the carcass of the furniture item is desired in the case of modern drawers. In this case, the front panel has to be adjustable not only in the direction of the vertical plane defined by the front panel. Rather, precise adjustment of the inclination of the front panel is also demanded. Vertical adjustment is performed conventionally in the rear wall region of the drawer for this purpose, the drawer remaining fixed in its front region in order to form a pivot axis. Consequently, the drawer is able to be tilted about said pivot axis such that the angular position of the front panel is also adjustable.

Such adjustment devices must be simple in design and reliably operable. In particular, unwanted adjustment of the angular position of the front panel during the operation of the drawer must be prevented. If, for example, during operation, in a drawer situated below, items located therein rear up and press against the drawer located above, it must be ensured that the adjustment device is not inadvertently adjusted.

It is consequently the object of the invention to provide an adjustment device of the type mentioned in the introduction where reliable adjustment of the front panel is possible with a simple design.

Said object is achieved as a result of the adjusting device of the adjustment device comprising two adjustable support portions which interact with counter bearings in such a manner that the actuating unit is adjustable in a guided manner in two opposite directions, as a result of the support portions being adjustable in each case on an eccentric track and as a result of the eccentric tracks being oriented in opposite directions. A positively driven adjustment of the drawer can be carried out by way of the two support portions both in the direction of the force of gravity and in opposition to the direction of the force of gravity. With a corresponding design, the counter bearings can be adjusted steplessly by way of the adjusting device.

When both support portions are guided in a play-free or substantially play-free manner in relation to the counter bearings, at least in a part region of their movement, an inadvertent height offset of the adjusted drawer is reliably prevented in said part region and consequently the position of the front panel is reliably maintained.

According to a preferred invention variant, it can be provided that the actuating unit is adjustable in the vertical direction in relation to the holder in such a manner that one support portion adjusts the actuating unit in the direction of the force of gravity and the other support portion adjusts the holder in the opposite direction to the direction of the force of gravity. As a result, the actuating unit can be supported in the vertical direction on both sides in relation to the holder and reliable alignment of the front panel is maintained.

Simple operation of the adjustment device can be achieved as a result of the adjusting device being held so as to be rotatable on the holder or the actuating unit. Less expenditure on parts and assembly can be achieved additionally as a result.

The operation can be further simplified when it is provided that the adjusting unit comprises a tool receiving means which is accessible laterally in the direction of the rotational axis of the adjusting element. In a preferred manner, the tool receiving means is accessible from the inside of the drawer. When it is provided that the adjusting element is adjustable between two or several latching positions, wherein the latching positions are preferably spaced apart from one another at the same spacings, then simple adjustment of the drawer is possible. In particular, when adjusting the adjusting element, a user can count the latching positions on the one side of the drawer. The corresponding number of latching positions can then be adjusted on the other side of the drawer such that the drawer is aligned identically on both sides. In addition, where the latching positions are correspondingly designed, inadvertent rotations between the holder and the actuating unit can be prevented. In addition to this or as an alternative to it, it can also be provided that the support portions interact with the counter bearings in a self-locking manner. Inadvertent adjustment of the adjusting positions can also be prevented in this way.

A further reduction in expenditure on assembly and expenditure on parts can be achieved as a result of the actuating unit preferably comprising guide pieces which are integrally molded in one piece and interact with guide portions of the holder to form a sliding guiding means.

A possible invention variant can be such that the actuating unit is held by means of a bearing part so as to be rotatable and in a secured manner in the direction of the rotational axis. In this case, it can also be provided, in particular, that the bearing part comprises a molded bearing attachment which interacts with the bearing receiving means of the adjusting unit to form a rotary bearing.

The assembly is additionally simplified in the case of such a design as a result of the holder, the actuating unit and the bearing part being connected, preferably being latchable together to form one structural unit.

A simple design is produced when it is provided that the counter bearings are integrally molded in one piece on the holder or on the actuating unit. In the case of an adjustment device according to the invention, it can additionally also be provided that the holder comprises a rearward angular deflection for coupling to the rear wall of a drawer.

Figure 2:
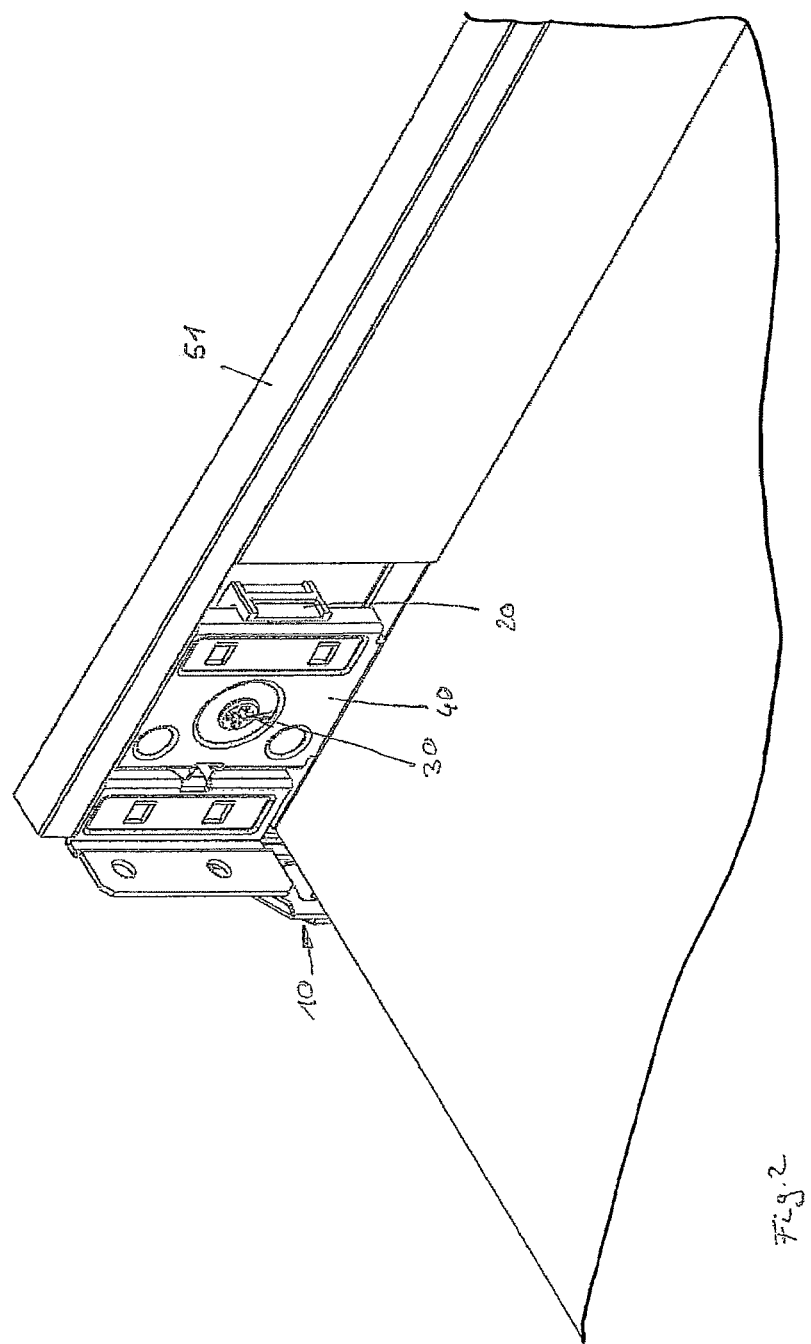
Figure 3:
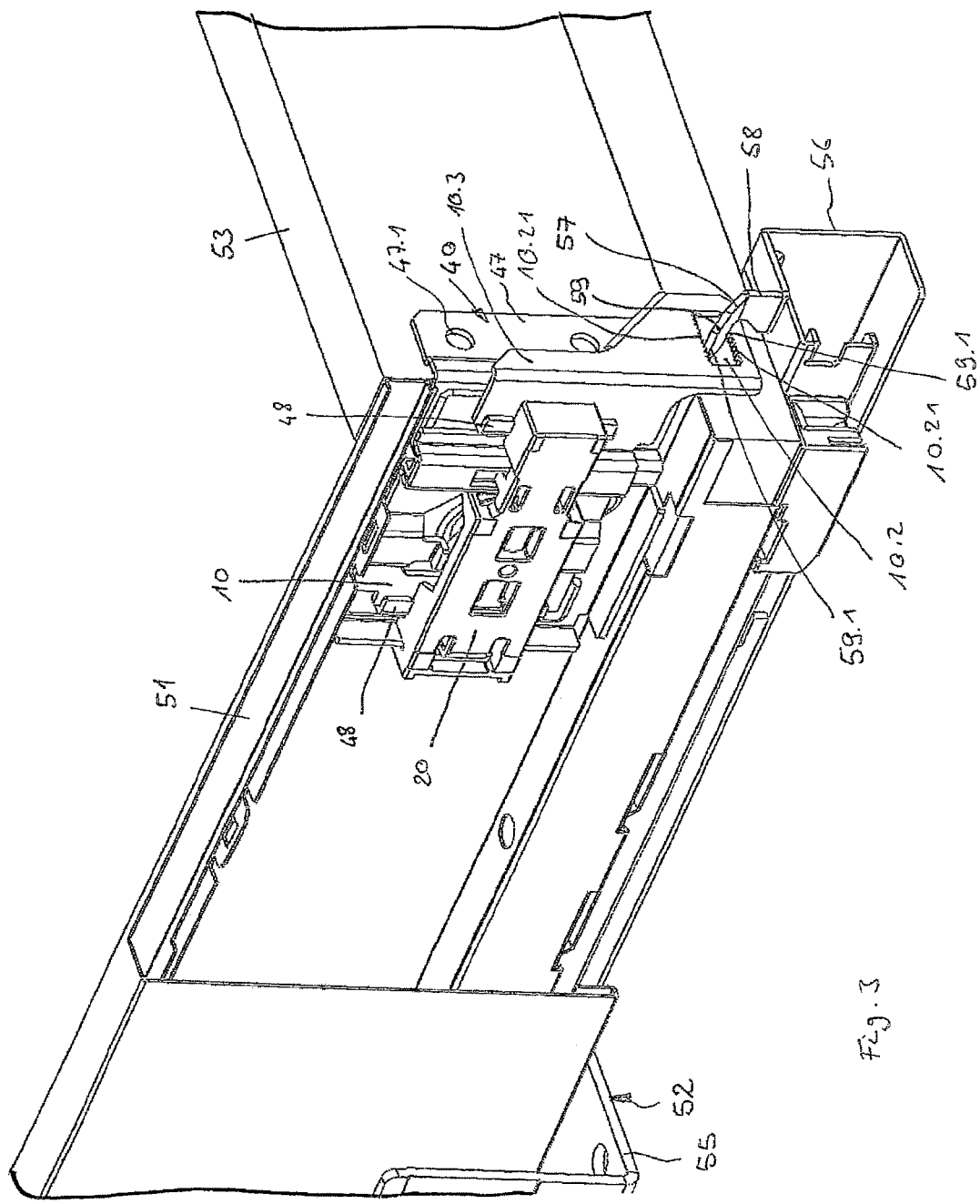
Figure 4:
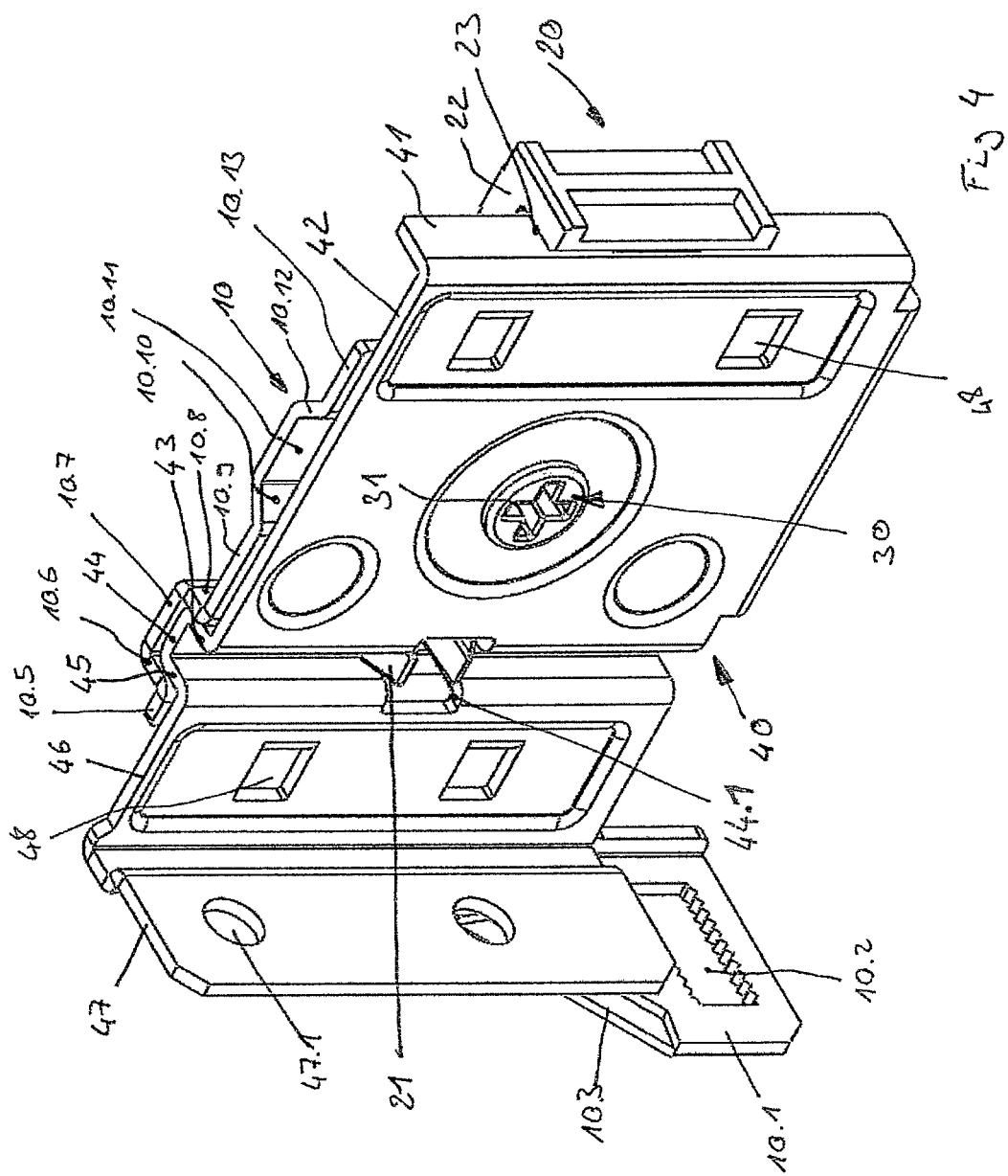
Figure 8:
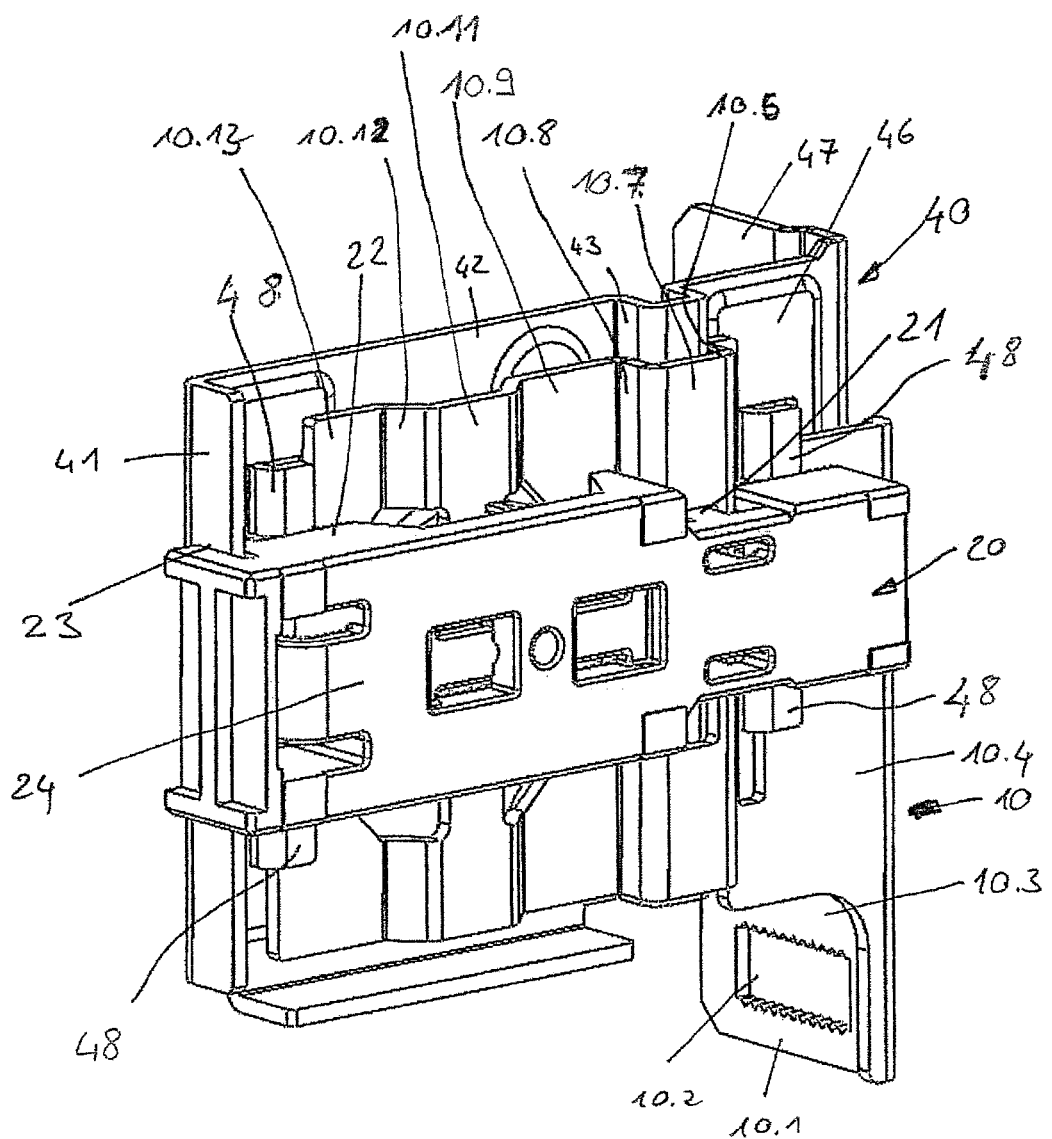
Figure 9:
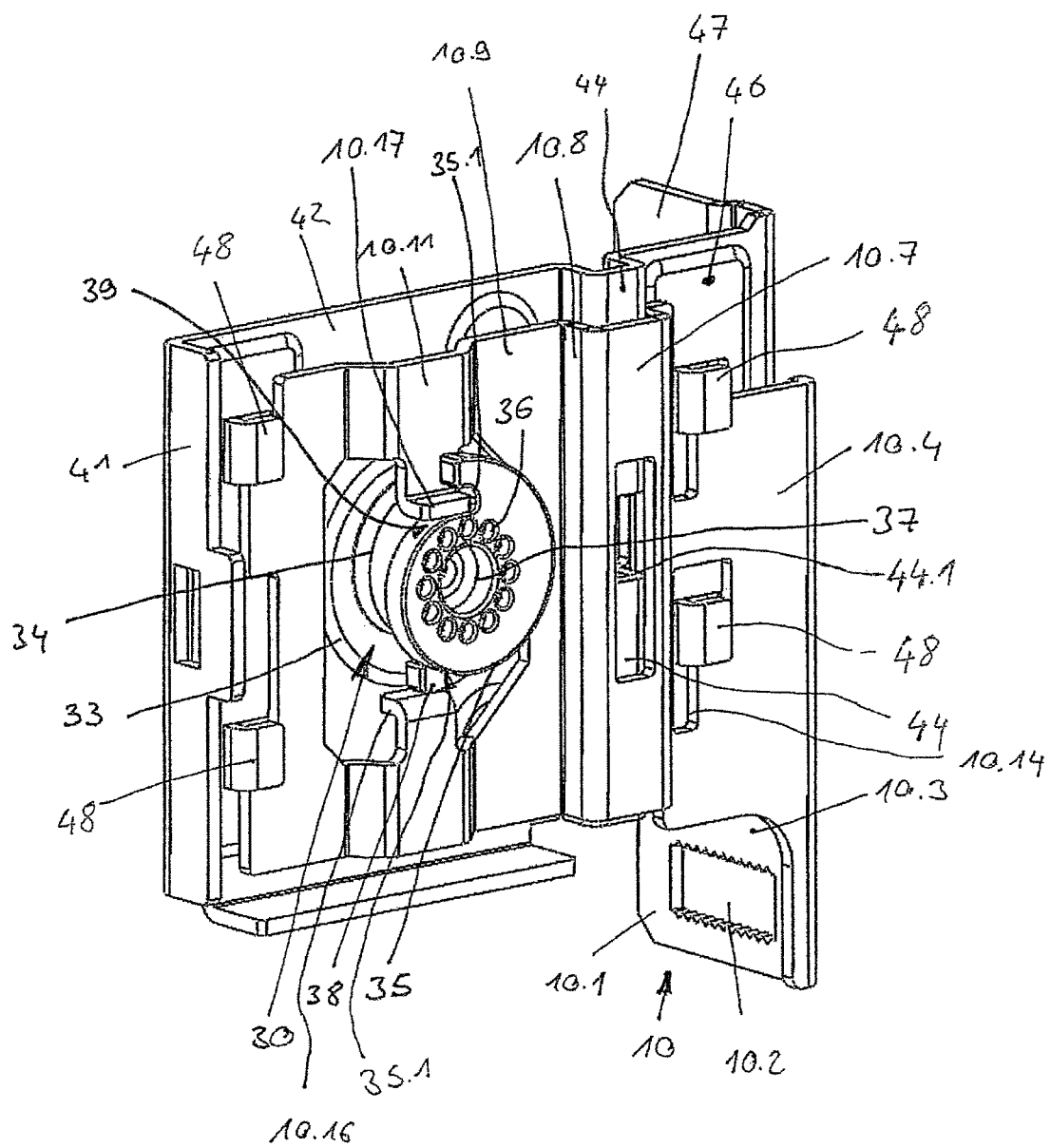

The invention is explained in more detail below by way of an exemplary embodiment which is shown in the drawings, in which:

FIG. 1 shows a perspective part representation of a drawer,

FIG. 2 shows the drawer according to FIG. 1 in perspective and with an enlarged view of the detail, the rear wall of the drawer having been removed, FIG. 3 shows a part-sectioned representation of a rear view of the drawer, FIG. 4 shows a perspective front view of an adjustment device, FIG. 5 shows the adjustment device according to FIG. 4, a holder having been disassembled, FIG. 6 shows a detail of the section taken from FIG. 7 along the cutting line VI-VI, FIG. 7 shows an interior view of the adjustment device, FIG. 8 shows a perspective exterior view of the adjustment device and FIG. 9 shows a modified assembly representation of the adjustment device according to FIG. 8

FIG. 1 shows a drawer 50 with a bottom 51, two frames 51 which extend in the depth direction and a rear wall 53. The front wall of the drawer 50 has been removed for better clarity. The frames 51 are realized as hollow wall frames and in their rear region each receive one adjustment device 30. In FIG. 2, for greater clarity and for representing the adjustment device, part of the inside wall of the frame 51 has been removed such that the view of the adjustment device is made possible. As can be seen in said representation, the adjustment device comprises a holder 10, a bearing part 20, the adjusting unit 30 and an actuating unit 40.

FIG. 3 shows an exterior corner of the drawer 50 in the rear wall region. In this case, the exterior surface of the frame 51 is shown cut such that the view of the exterior of the adjustment device is made possible. As can be seen in said representation, the frame 51 is mounted in a conventional manner on an extension rail 52. The extension rail 52 has a carcass rail 55 by way of which it can be fastened to the inside of a furniture item carcass. In addition, the extension rail 52 includes a center rail and a drawer rail 56. The drawer rail 56 is adjustable in the direction of the depth of the drawer in relation to the carcass rail 55.

The drawer 50 is conventionally assembled such that first of all the two frames 51 are fastened to the sides of the bottom 54. The adjustment device is received inside the hollow chamber of the frame 51 and is fastened therein. Once the frames 51 have been installed with the bottom 54, the rear wall 53 can be screwed to the actuating unit 40. The drawer 50, assembled in this manner, can then be inserted into a region of a furniture item carcass provided for this purpose. The two extension rails 52 are already mounted in said region. The drawer 50 can be fitted onto the bottom side of the drawer rail 56 and slid thereon in the depth direction. As can be seen in FIG. 3, an arresting hook 57 is fastened on the drawer rail 56. In the present case, the arresting hook 57 is realized as a separate component which is connected, for example welded, to the drawer rail 56. As an alternative to this, the arresting hook 57 can also be freely punched from the drawer rail 56 and angled off from said drawer rail. The arresting hook 57 has an attachment portion 58 by means of which it is connected to the cover side of the drawer rail 56. A hook head 59 of the arresting hook 57 is developed in a plate-shaped manner and is inclined at a predefined angle with reference to the horizontal, preferably inclined within the range of between 30 and 60°. In the region of its hook head 59, the arresting hook 57 is provided with two drafts 59.1 which are inclined toward one another, the drafts 59.1 are set in an arrow-shaped manner with respect to one another. The drafts 59.1 are part of a projection of the hook head 59 which engages in a recess 10.2 of the holder 10. The recess 10.2 comprises toothings 10.2 1 on oppositely situated sides. The toothings 10.2 1 comprise teeth which are arranged spaced apart from one another preferably at the same spacings. The drafts 59.1 mesh in each case with a toothing 10.2 1. Accordingly, the upper draft 59.1 is supported on the upper toothing 10.2 1 and the lower draft 59.1 is supported on the lower toothing 10.2 1. When, therefore, the drawer 50 is slid in the depth direction, it moves into engagement with the arresting hook 57, which delimits the depth adjustment of the drawer 50. In this case, the drafts 59.1 move into engagement with the toothing 10.2 1, which is facilitated by the arrow-shaped setting of the drafts 59.1. Play-free clamping of the drawer 50 in the rear wall region both in the vertical and horizontal direction is brought about in this way. The transverse extent of the recess 10.2 in the horizontal direction is greater than the extent of the hook head 59 in said direction. The drawer 50 is able to be adjusted laterally in a delimited manner in this way. Tolerance compensation in the horizontal direction can therefore be performed by way of said measure. In this case, a tolerance-related carcass width or rather a tolerance-related variation in the width of the bottom 54 can be reacted to and compensated for by way of said tolerance compensation.

The afore-described arrangement of an arresting hook 54 and a recess 10.2 is preferably provided on both sides of the rear wall 53 of the drawer 50.

The design and method of operation of the adjustment device is explained in more detail below. The adjustment device includes a holder 10, an actuating unit 40 as well as an adjusting unit 30 which is set between the actuating unit 40 and the holder 10. A bearing part 20 is used to fix said components.

As can be seen in FIG. 3, the holder 10 has a support part 10.1 which is provided with the recess 10.2. The toothings 10.2 1 of the recess 10.2 can clearly be seen in FIG. 5. The support part 10.1 is part of an angular deflection 10.3 which is connected to a folded edge 10.4. Guide portions 10.5 to 10.8 connect to the folded edge 10.4. In this case, each of the adjacent guide portions 10.5 to 10.8 can preferably be at right angles to one another. The guide portion 10.8 merges into a wall 10.9. A folded edge 10.10, which merges via a transition portion 10.11 into a further folded edge 10.12, is angled from the wall 10.9. At its free end, the holder 10 closes off with an end portion 10.13. The holder 10 is provided with a recess 10.15 which is realized, for example, in the form of a breakthrough. Attachments of the holder 10.14, which bear counter bearings 10.16, 10.17, project into the region of the recess 10.15. For this purpose, in the present exemplary embodiment, lobe-shaped portions are bent off from the transition portion 10.11 in order to form the counter bearings 10.16 and 10.17. As can be seen in FIG. 5, the counter bearings 10.16, 10.17 are angled in opposite directions.

It can be seen further in FIG. 5 that a recess in the form of a window 10.14 is provided in the region of a guide portion 10.7. The holder 10 is preferably produced as a punched-bent part from a sheet blank.

FIG. 4 shows the actuating unit 40 which can be connected to the holder 10. The actuating unit 40 has a bearing wall 42 from which an attachment 41 is bent off toward the rear side. Oppositely situated to the attachment 41, the bearing wall 42 comprises guide pieces 43, 44, 45. Three guide pieces 43, 44, 45, which are connected together in a U-shaped manner, are used in the present case. The choice of the number and of the arrangement of the guide pieces 43, 44, 45 is designed so as to be adapted to the guide portions 10.5 to 10.8 of the holder 10. In this way, the guide pieces 43, 44, 45 and the guide portions 10.5 to 10.8 can interact to form a linear sliding guide. An end portion 46 connects to the guide pieces 43, 44, 45. Said end portion 46 merges via a folded edge into a fastening piece 47. The fastening piece 47 is provided with fastening receiving means 47.1. As can be seen in FIG. 4, the actuating unit 40 can be fitted onto the holder 10. In this case, the guide pieces 43 to 45 engage in the guide receiving means which is formed by the guide portions 10.5 to 10.8. The front wall 42 abuts in a sliding manner against the wall 10.9 and the wall portion 10.13 of the holder 10. As can be seen in FIG. 3, the fastening piece 47 and the angular deflection 10.3 additionally abut against one another. It can be seen in said drawing and in particular also in FIG. 8 that the actuating unit 40 comprises guide hooks 48. Said guide hooks can be freely punched, for example, from the actuating unit 40 and bent rearwardly. The guide hooks 48 surround guide receiving means. The vertical edge of the wall portion 10.13 is slid into said guide receiving means of the guide hooks 48. FIG. 9 shows that the folded edge 10.4 of the holder 10 also comprises exposed edge portions which are engaged over by the guide hooks 48. Consequently, longitudinal guides are formed by way of the guide hooks 48 and the associated edge portions of the holder 10. In addition, the guide hooks 48 connect the holder 10 and the actuating unit 40 together.

FIG. 9 shows an adjusting unit 30 which can be realized as a rotary body. The adjusting unit 30 is arranged at least in regions between the holder 10 and the actuating unit 40. More details of the design of the adjusting unit 30 can be seen in FIG. 6. As is shown in said representation, the adjusting unit 30 has a tool receiving means 31. Said tool receiving means 31 can be introduced into a bearing piece 32. The tool receiving means 32 is arranged and aligned such that it is accessible from the inside of the drawer 50 (see FIG. 1). The bearing piece 32 is realized in the form of a cylinder. A guide, which is realized in the form of a first eccentric 33, connects to the bearing piece 32. The actuating unit 30 additionally includes a second eccentric 35. The two eccentrics 33 and 35 are connected together in one piece by means of a connecting portion 34. As shown in FIG. 9, each eccentric 33, 35 forms a curved track which comprises a support portion 38, 39. The eccentrics 33, 35, in this case, are oriented in opposite directions and are designed identically with regard to their curved track guide. Whereas the outer eccentric, which faces the observer in FIG. 9, creates, with reference to the rotational axis of the adjusting unit 30, a continuous increase in the distance from the support portion 39 in a counterclockwise direction, in the case of the second eccentric 33, the distance from the fastening portion increases in a clockwise direction. For this purpose, in the exemplary embodiment, the guide tracks of the eccentrics 33, 35 are mirrored by 180° both about the vertical plane, which extends through the rotational axis of the adjusting unit 30, and the horizontal plane. The support portions 38, 39 of the adjusting unit 30 interact with the counter bearings 10.16 and 10.17. Accordingly, the counter bearings 10.16, 10.17 abut in each case against the support portions 38, 39. In this case, the abutment is arranged such that the support portions 38, 39 abut in a play-free manner against the counter bearings 10.16, 10.17. Play-free, in this context, means that there can be a tolerance gap within the range of between 0 and 0.2 mm between said components. The geometry and alignment of the eccentricity is chosen such that the distance between the support portions 38, 39 is always the same in the abutment region of the counter bearings 10.16, 10.17 irrespective of the rotational position of the adjusting unit 30. If then, for example, in FIG. 9, the adjusting unit 30 is rotated clockwise, the eccentric 35 lifts the counter bearing 10.17 continuously upward, as a result of which, with the holder 10 fixed, the adjustment unit 40 slides downward. When the adjusting unit 30 is rotated in this manner, at the same time the counter bearing 10.16 also abuts against the eccentric 33 such that zero play is achieved in the vertical direction between the holder 10 and the actuating unit 40.

It can be seen in FIG. 9 that the adjusting unit 30 is provided with a bearing receiving means 37 on its side remote from the bearing piece 32. Said bearing receiving means 37 is realized as a hollow cylinder. It can be seen in FIG. 6 that a bearing attachment 25 of the bearing part 20 engages in said bearing receiving means 37 to form a rotary bearing arrangement. According to FIG. 8, the bearing part 20 is provided with a cover portion 24, onto which the bearing attachment 25 is integrally molded in one piece. Side walls 22 proceed from the cover portion 24. Said side walls 22 are supported on the exterior surface of the holder 10. In addition, the bearing part 20 includes latching hooks 21. The bearing part 20 is provided with a receiving means 23 in the region of the front side. Said receiving means is realized as a slot-shaped receiving means 23 in the present exemplary embodiment. The bearing part can be slid onto the attachment 41 by way of said receiving means 23. In the case of said sliding movement, the bearing attachment 25 is also inserted into the bearing receiving means 37 of the adjusting unit 30. If the joining movement is continued further, the latching hooks 21 reach through the window 10.14 of the folded edge 10.4 (see FIG. 9) and latch on oppositely situated latching edges 44.1 of the guide piece 44 of the actuating unit 40 (see also FIG. 9). The holder 10, the adjusting unit 30 and the actuating unit 40 are reliably connected together by way of the bearing part 20.

The afore-described adjustment device is accommodated, as already specified above, in the hollow chamber of a hollow chamber frame 51. It is coupled in a suitable manner therein with the holder 10. For example, the holder 10 can be welded to the frame 51. The actuating unit 40 is connected to the rear wall 53 of the drawer 50 by means of the fastening piece 47. To this end, for example, fastening screws can be guided through the fastening receiving means 47.1 and screwed into the rear wall 53. Consequently, the actuating unit 40 is therefore fixedly connected to the drawer 50. The holder 10 is coupled fixedly to the extension rail 52 via the frame 51 and the support part 10.1, as has already been described above. As the extension rail 52 is part of the furniture item carcass, the holder 10 is consequently fixedly associated with the furniture item carcass. If then a suitable tool, for example a screwdriver, is placed into the tool receiving means 31 and the adjusting unit 30 is rotated from the inside of the drawer, the actuating part 40 is adjusted in the vertical direction in relation to the holder 10 via the above-described eccentric mechanism. Irrespective of the rotational direction, the actuating part 40 can be displaced either up or down. By way of said displacement, the vertical alignment of the drawer 50 in the rear wall region is then also modified. The drawer 50 is now fixedly assigned to the drawer rail 56 in its front wall region. Consequently, a pivoting of the drawer 50 is ultimately achieved as a result of the vertical adjustment in the rear wall region. Said pivoting leads to the angular alignment of the front panel of the drawer 50 being able to be modified in relation to the vertical. Adjustment devices are preferably assigned to the frames 51 on both sides of the drawer 50. In this case, the adjustment devices are designed in a mirror-symmetrical manner. When the adjusting units 30 of the two adjustment devices are rotated by the same amount, uniform tilting of the front panel is produced on both sides of the drawer 50. In order to make it easier for the user to make an adjustment in a uniform manner, the adjusting unit 30 is provided with detent mechanisms 36, as can be seen in FIG. 9. Said detent mechanisms 36 are arranged spaced apart from one another at identical spacings and are arranged on a pitch circle which runs around the rotational axis of the adjusting unit 30. The detent mechanisms 36 interact with counter latching elements of the bearing part 20. For example, the detent mechanisms 36, as shown in FIG. 9, can be realized as detent mechanism receiving means. A resiliently realized counter latching element can be arranged on the underside of the cover portion 24 of the bearing part 20, for example integrally molded in one piece on the bearing part 20. The use of a resilient latching tongue is conceivable. When the adjusting unit 30 is rotated, the counter latching element latches in the detent mechanism receiving means 36 which is assigned thereto. Stepless adjustment of the adjusting unit 30 is possible in this way. In dependence on the realization of the latching connection, said latching adjustment is also easily audible to the user such that, in addition, he also receives an acoustic signal and is therefore able to count the number of latching steps.

It can be seen in FIG. 9 that to avoid a malfunction and over-rotation of the adjusting unit 30, stops 33.1, 35.1 are provided at the end of each of the eccentrics 33, 35. Said stops 33.1, 35.1 interact with the counter bearings 10.16 and 10.17 for delimiting the rotational movement.

The invention claimed is:

1. An adjustment device for adjusting an alignment of a front panel of a drawer, the adjustment device comprising:
    a holder (10);
    a bearing part (20);
    an actuating unit (40);
    an adjusting unit (30) configured to adjust the actuating unit (40) in relation to the holder (10), wherein the adjusting unit (30) is held in a secured manner by the bearing part (20) so as to be rotatable in a direction of a rotational axis of the adjusting unit (30), the adjusting unit comprising a first eccentric (33) having a first track forming a first support portion (38) and a second eccentric (35) having a second track forming a second support portion (39);
    a first counter bearing (10.16) interacting with the first support portion (38) and a second counter bearing (10.17) interacting with the second support portion (39), wherein the first track and the second track are oriented in opposite directions such that the actuating unit (40) is adjustable in a guided manner in two opposite directions, and the adjusting unit (30) is adjustable between at least three latching positions, wherein each latching position of the at least three latching positions is evenly spaced from adjacent latching positions of the at least three latching positions; and
    a plurality of detent mechanisms (36) arranged on a pitch circle around the rotational axis of the adjusting unit (30) and a plurality of latching elements arranged on the bearing part (20), a first detent mechanism of the plurality of detent mechanisms interacting with a corresponding first latching element of the plurality of latching elements to define a first latching position of the at least three latching positions.

2. The adjustment device as claimed in claim 1, wherein the support portions (38, 39) are guided in a play-free or substantially play-free manner in relation to the counter bearings (10.16, 10.17) at least in a part region of their movement.

3. The adjustment device as claimed in claim 1, wherein the actuating unit (40) is adjustable in a vertical direction in relation to the holder (10) in such a manner that the first support portion (38) adjusts the actuating unit (40) in a direction of a force of gravity and the second support portion (39) adjusts the holder (10) in an opposite direction to the direction of the force of gravity.

4. The adjustment device as claimed in claim 1, wherein the adjusting unit (30) is rotatable on the holder (10) or the actuating unit (40).

5. The adjustment device as claimed in claim 1, wherein the adjusting unit (30) comprises a tool receiving means (31) accessible laterally in a direction of the rotational axis of the adjusting unit (30).

6. The adjustment device as claimed in claim 1, wherein the actuating unit (40) comprises a plurality of guide pieces (43, 44, 45) which are integrally molded in one piece and interact with a plurality of guide portions (10.5 to 10.8) of the holder (10) to form a sliding guide.

7. The adjustment device as claimed in claim 1, wherein the bearing part (20) comprises a molded bearing attachment (25) which interacts with a bearing receiving means (37) of the adjusting unit (30) to form a rotary bearing.

8. The adjustment device as claimed in claim 1, wherein the holder (10), the actuating unit (40) and the bearing part (20) are latched together.

9. The adjustment device as claimed in claim 1, wherein the first counter bearing (10.16) and the second counter bearing (10.17) are integrally molded in one piece on the holder (10) or the actuating unit (40).

10. The adjustment device as claimed in claim 9, wherein the holder (10) comprises a rearward angular deflection (10.3) for coupling to a rear wall of the drawer.

* * * * *